Aug. 28, 1951   G. RICHARD   2,565,990
WING-TIP CONTROL SURFACE FOR AIRCRAFT
Filed Aug. 4, 1947   2 Sheets-Sheet 1

INVENTOR
Gilbert Richard
BY Henry J. Lucke
ATTORNEY

Aug. 28, 1951  G. RICHARD  2,565,990
WING-TIP CONTROL SURFACE FOR AIRCRAFT
Filed Aug. 4, 1947  2 Sheets-Sheet 2

INVENTOR
Gilbert Richard
BY
ATTORNEY

Patented Aug. 28, 1951

2,565,990

UNITED STATES PATENT OFFICE 2,565,990

WING-TIP CONTROL SURFACE FOR AIRCRAFT

Gilbert Richard, Epone, France, assignor to Office National d'Etudes & de Recherches Aeronautiques, Paris, France Application August 4, 1947, Serial No. 765,991
In France October 31, 1945

Section 1, Public Law 690, August 8, 1946
Patent expires October 31, 1965

2 Claims. (Cl. 244—90)

The present invention relates to airplanes and all flying machines having aerofoils, and its object is to improve the control of such machines.

Preferred embodiments of my invention will be hereinafter described with reference to the accompanying drawings, given merely by way of example and in which.

According to an essential feature of my invention, the rudder and flaps provided on an aerofoil of conventional construction are replaced by end-plates pivoted to the tips of said aerofoil about axes oblique to the fore and aft direction thereof, said end plates being adapted, in neutral position, to act as stabilizing fins.

Figure 1:
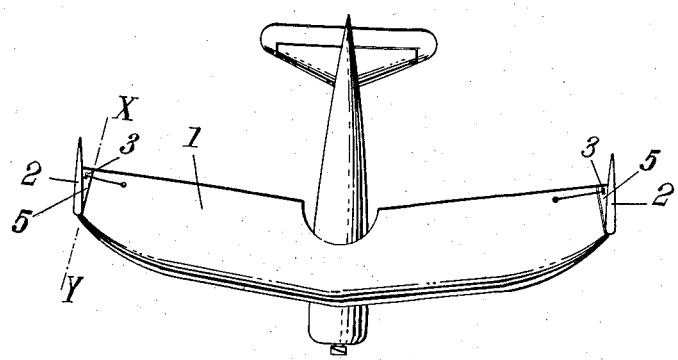
Fig. 1 is a plan view of an airplane according to my invention.

For instance, as shown by Fig. 1, an airplane wing 1 is provided, at its respective tips, with end-plates 2 of any suitable shape, profile and size adapted, in neutral position, to act as stabilizing fins, and which may have a certain incidence with respect to the relative wind. Each end-plate carries, rigid therewith, a surface element 5, substantially at right angles thereto so that, in neutral position, each surface element 5 is in line with wing 1 and actually forms one wing tip. Each surface element 5 is mounted to pivot about an axis XY located in the general plane of wing 1 and making an angle $x°$ with the fore and aft axis of the aircraft. Suitable means, including for instance horns 3, enable the pilot to control at will the positions of said end-plates about their axes XY.

Figure 2:
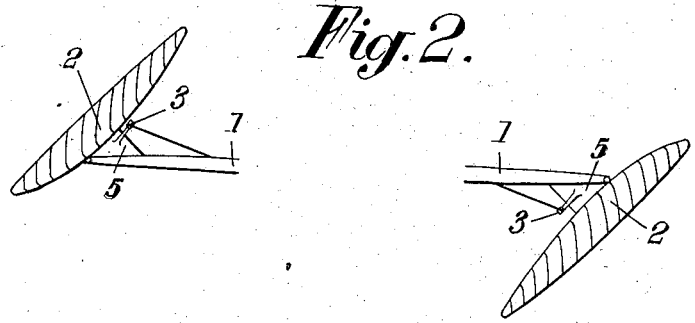
Fig. 2 is a part front view of this airplane, for a given position of the controls.

If the two end-plates are turned simultaneously and in opposite directions about their respective axes, as shown by Fig. 2, the aerodynamic reaction on the end-plates urges the airplane to roll about its fore-and-aft axis, which permits of maintaining lateral stability without requiring aileron action.

Figure 3:
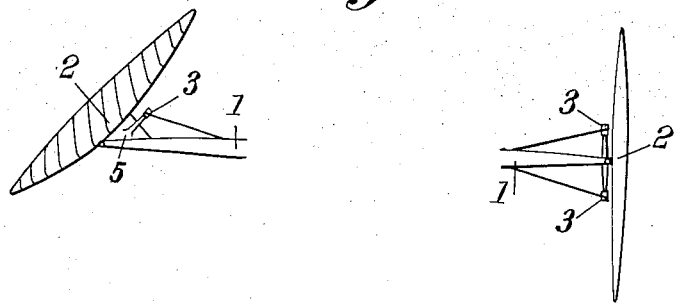
Fig. 3 is a view similar to Fig. 2 showing another position of the controls.
Figure 4:
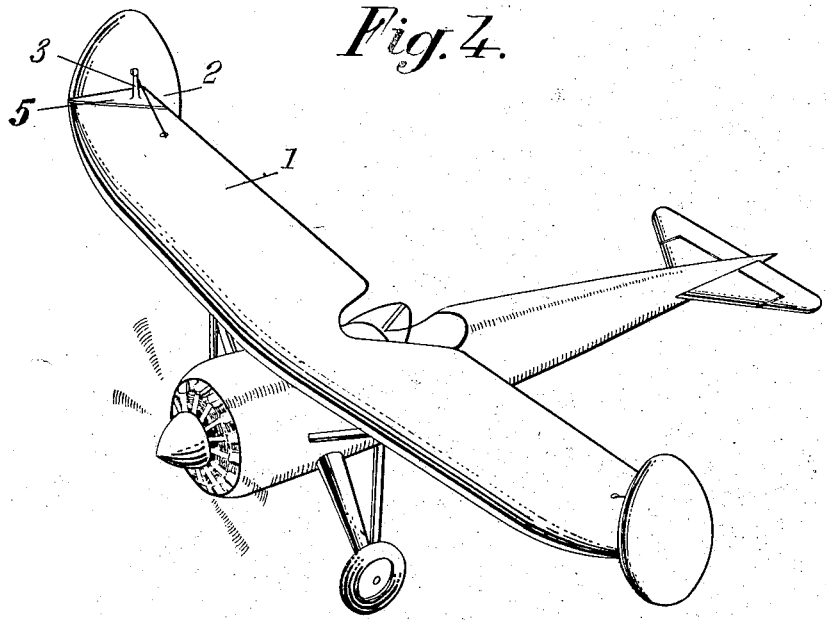
Fig. 4 is a perspective view corresponding to Fig. 1.
Figure 5:
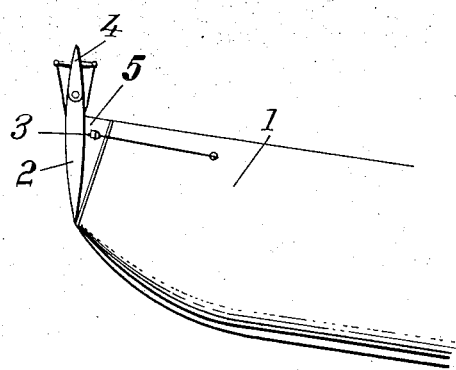
Fig. 5 is a part plan view, relating to a modification.

If one end-plate is left in neutral position while the other is pivoted as shown by Fig. 3, the drag of the inclined end-plate then supplies without rudder the yaw moment necessary for banking.

The yaw moment for banking may also be obtained (Fig. 2) by pivoting end-plates 2 in opposed directions, as for maintaining lateral stability, and increasing the drag of the end-plate located inside of the bank. This increase of the drag is, for instance, obtained by pivoting a slot flap 4 carried by the end-plate.

This arrangement has for its effect: to make the conventional aileron unnecessary, so that the whole of the wing trailing edge is available to fit lift increase or other devices thereon; to make the rudder and its vertical fin unnecessary and, therefore, to avoid interactions between these parts and the horizontal stabilizer; to simplify controls since a single element plays the parts normally played, in a conventional airplane, by two distinct elements.

Of course, the end-plates may be operated, either automatically or directly by the pilot.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An aircraft which comprises, in combination, at least one wing, two end plate aerodynamic control surfaces each hinged to one tip of said wing about an axis located in the general plane of said wing at the extreme tip thereof and oblique to the fore and aft axis of the aircraft, each of said hinge axes passing substantially through the leading edge of the corresponding end plate and said axes converging in the rearward direction, each of said end plates in its neutral position for normal flight conditions being at right angles to the general plane of said wing and at least substantially parallel to the longitudinal plane of symmetry of said aircraft, and positive control means for giving at will to said end plate control surfaces adjustable positions of limited inclination with respect to said wing about their respective axes on either side of their neutral positions.

2. An aircraft which comprises, in combination, at least one wing, two end plate aerodynamic control surfaces each hinged to one tip of said wing about an axis located in the general plane of said wing at the extreme tip thereof and oblique to the fore and aft axis of the aircraft, said axes converging in the rearward direction, each of said end plates extending above and below said wing and being located, when in its neutral position, at right angles to the general plane of said wing and at least substantially parallel to the longitudinal plane of symmetry of said aircraft, and positive control means for giving at will to said end plate control surfaces adjustable positions of limited inclination with respect to said wing about their respective axes on either side of their neutral positions.

GILBERT RICHARD.

REFERENCES CITED

The following references are of record in the file of this patent:

UNITED STATES PATENTS

| Number | Name | Date |
|---|---|---|
| 1,350,938 | Petersen | Aug. 24, 1920 |
| 1,495,031 | Muzik | May 20, 1924 |
| 2,105,307 | Akerman | Jan. 11, 1938 |
| 2,120,760 | Lumiere | June 14, 1938 |

FOREIGN PATENTS

| Number | Country | Date |
|---|---|---|
| 679,123 | France | Jan. 5, 1930 |